United States Patent
De Lamberterie et al.

(10) Patent No.: US 10,724,700 B2
(45) Date of Patent: Jul. 28, 2020

(54) LIGHTING DEVICE GENERATING STRIPE SEGMENTED BEAM FOR A MOTOR-VEHICLE HEADLAMP

(71) Applicant: VALEO VISION, Bobigny (FR)

(72) Inventors: Antoine De Lamberterie, Bobigny (FR); Yves Gromfeld, Angers (FR)

(73) Assignee: VALEO VISION, Bobigny (FR)

( * ) Notice: Subject to any disclaimer, the term of this patent is extended or adjusted under 35 U.S.C. 154(b) by 84 days.

(21) Appl. No.: 15/720,350

(22) Filed: Sep. 29, 2017

(65) Prior Publication Data

US 2018/0087732 A1 Mar. 29, 2018

(30) Foreign Application Priority Data

Sep. 29, 2016 (FR) ...................... 16 59375

(51) Int. Cl.
*F21S 41/25* (2018.01)
*F21S 41/16* (2018.01)
(Continued)

(52) U.S. Cl.
CPC ............... *F21S 41/25* (2018.01); *B60Q 1/06* (2013.01); *B60Q 1/16* (2013.01); *F21S 41/141* (2018.01);
(Continued)

(58) Field of Classification Search
CPC .......... F21S 41/24; F21S 41/26; F21S 41/663; F21S 41/265; F21S 41/16; F21S 41/27; F21S 41/143; F21S 41/255
See application file for complete search history.

(56) References Cited

U.S. PATENT DOCUMENTS

| | | | |
|---|---|---|---|
| 2008/0151567 A1* | 6/2008 | Albou | F21S 41/147 362/507 |
| 2008/0239746 A1* | 10/2008 | Wuller | B60Q 1/085 362/538 |

(Continued)

FOREIGN PATENT DOCUMENTS

| | | |
|---|---|---|
| EP | 2 743 567 A1 | 6/2014 |
| EP | 2 871 406 A1 | 5/2015 |
| WO | WO 2016/050983 A1 | 4/2016 |

OTHER PUBLICATIONS

French Preliminary Search Report dated May 30, 2017 in French Application 16 59375 filed on Sep. 29, 2016 (with English Translation of Categories of Cited Documents).

*Primary Examiner* — Jong-Suk (James) Lee
*Assistant Examiner* — Christopher E Dunay
(74) *Attorney, Agent, or Firm* — Oblon, McClelland, Maier & Neustadt, L.L.P.

(57) ABSTRACT

A motor-vehicle lighting device including a plurality of primary optical elements, intermediate lenses, and a curved projecting lens. Each primary optical element has a curved exit refracting surface and comprises a plurality of rectangular light guides that are each intended to interact with one light-emitting diode one laser. Each intermediate lens is placed between an exit refracting surface of the primary optical element and the projecting lens. Each intermediate lens is configured to distribute and concentrate the radiation issued from an exit refracting surface of the element over and onto the projecting lens. The lighting device is configured so as to project the diode radiation entering into the light guides and exiting via the projecting lens in the form of luminous pixels, or luminous strips, the light intensity of each of which is controlled despite the curvature of the projecting lens.

21 Claims, 4 Drawing Sheets

(51) Int. Cl.
*F21S 41/255* (2018.01)
*F21S 41/143* (2018.01)
*F21S 41/26* (2018.01)
*F21S 41/663* (2018.01)
*F21S 41/265* (2018.01)
*F21S 41/27* (2018.01)
*F21S 41/153* (2018.01)
*F21S 41/24* (2018.01)
*F21S 41/141* (2018.01)
*B60Q 1/06* (2006.01)
*B60Q 1/16* (2006.01)
*F21W 102/145* (2018.01)

(52) U.S. Cl.
CPC .......... *F21S 41/143* (2018.01); *F21S 41/153* (2018.01); *F21S 41/16* (2018.01); *F21S 41/24* (2018.01); *F21S 41/255* (2018.01); *F21S 41/26* (2018.01); *F21S 41/265* (2018.01); *F21S 41/27* (2018.01); *F21S 41/663* (2018.01); *F21W 2102/145* (2018.01)

(56) References Cited

U.S. PATENT DOCUMENTS

| | | | | |
|---|---|---|---|---|
| 2014/0009938 | A1* | 1/2014 | Hossfeld | F21V 5/08 362/244 |
| 2014/0169015 | A1* | 6/2014 | Chen | F21S 41/16 362/510 |
| 2015/0131305 | A1* | 5/2015 | Courcier | F21S 41/141 362/516 |
| 2015/0330589 | A1* | 11/2015 | Kloos | F21S 41/663 362/521 |
| 2018/0073700 | A1* | 3/2018 | Orisich | F21S 41/63 |

* cited by examiner

LIGHTING DEVICE GENERATING STRIPE SEGMENTED BEAM FOR A MOTOR-VEHICLE HEADLAMP

TECHNICAL FIELD

The invention relates to the field of lighting devices, in particular for motor-vehicle headlamps. The invention also relates to a motor-vehicle headlamp optical unit equipped with a lighting device according to the invention.

PRIOR ART

A motor vehicle is equipped with headlamps, or headlights, intended to illuminate the road in front of the vehicle, at night or in case of low luminosity. Headlamps may generally be used in two lighting modes: a "high-beam" first mode and a "low-beam" second mode. The "high-beam" mode allows the road far in front of the vehicle to be brightly lit. The "low-beam" mode provides a more limited illumination of the road, but nevertheless ensures good visibility without dazzling other road users. These two lighting modes are complementary. The driver of the vehicle must manually change mode depending on the circumstances, at the risk of inadvertently dazzling another road user. In practice, changing lighting mode manually may lack reliability and sometimes prove to be dangerous. Furthermore, the low-beam mode sometimes provides a level of visibility that is unsatisfactory for the driver of the vehicle.

To improve the situation, headlamps endowed with an adaptive-driving-beam (ADB) function have been proposed. Such an ADB function is intended to automatically detect a road user liable to be dazzled by a lighting beam emitted in high-beam mode by a headlamp, and to modify the outline of this lighting beam so as to create a zone of shadow in the location in which the detected user is located. The advantages of the ADB function are multiple: user comfort, better visibility with respect to illumination in low-beam mode, better reliability as regards change of mode, greatly decreased risk of dazzle, safer driving.

Document EP2743567A1 discloses a motor-vehicle headlamp endowed with modules generating lighting in strips through a projecting lens. Each module comprises a series of light guides allowing radiation emitted by light-emitting diodes to be shaped. By virtue of such a headlamp, it is possible to light an environment using luminous strips the positions of which are controlled. However, to integrate a headlamp into a given vehicle the projecting lens of the lighting modules must have a specific shape. This shape must have a curvature i.e. a precise roundedness. This constraint leads to geometric distortions such as field aberrations. Certain strips then exhibit fluctuations in light intensity, and possibly dark zones. The combination of the strips is no longer suitable for an automobile light, and the safety with which the vehicle may be driven is decreased because of these nonuniformities.

SUMMARY OF THE INVENTION

Technical Problem

The objective of the invention is to solve at least one of the problems posed by the prior art. More precisely, one objective of the invention is to decrease the field aberrations of a lighting device generating stripe segmented beamfor a headlamp. Another objective of the invention is to decrease the geometric distortions of such a lighting device despite external geometric constraints and in particular constraints on the curvature of the projecting lens.

Technical Solution

One subject of the invention is a lighting device generating stripe segmented beam, for a motor-vehicle headlamp, said lighting device comprising: a primary optical element equipped with pixel-forming means and having an exit refracting surface, said element being intended to interact with a primary light source; and a projecting lens; the lighting device being configured so as to project light entering into the pixel-forming means and exiting via the projecting lens in the form of a luminous pixel, i.e. in a form such as the form of a luminous strip; noteworthy in that it furthermore comprises an intermediate lens that is placed between the exit refracting surface of the primary optical element and the projecting lens, and that is configured so as to concentrate the radiation issued from the exit refracting surface of the primary optical element onto the projecting lens.

According to one advantageous embodiment of the invention, the exit refracting surface of the primary optical element is generally spherical, and the pixel-forming means comprise at least one light guide having a rectangular profile transversely to the lighting direction of the lighting device.

According to one advantageous embodiment of the invention, in the normal mounting order the intermediate lens comprises an entrance refracting surface with a profile that is convex in a horizontal plane, and optionally a profile that is concave in a vertical plane.

According to one advantageous embodiment of the invention, in the normal mounting order the intermediate lens comprises an exit refracting surface with a profile that is convex in a vertical plane, and optionally in a horizontal plane.

According to one variant of the invention, in the normal mounting order the intermediate lens comprises a real focal point and is at least of the same height than the projecting lens, or the intermediate lens comprises a virtual focal point and is of lesser height than the projecting lens.

According to one advantageous embodiment of the invention, the primary optical element comprises a plurality of light guides, each intended to interact with a primary light source, the lighting device being configured so as to project a plurality of luminous pixels and in particular a plurality of parallel luminous strips, each corresponding to one of the primary light sources.

According to one advantageous embodiment of the invention, the lighting device comprises at least one primary light source and in particular a light-emitting diode and/or a laser, each source being associated with a light guide.

According to one advantageous embodiment of the invention, in a plane that is vertical in the normal mounting order, the projecting lens comprises an entrance refracting surface with a profile that is concave or planar and an exit refracting surface with a convex profile.

According to one advantageous embodiment of the invention, in a plane that is vertical in the normal mounting order, the projecting lens has a divergent-lens profile.

According to one advantageous embodiment of the invention, the lighting device comprises a plurality of primary optical elements and a plurality of intermediate lenses, each intermediate lens being associated with a primary optical element and placed between the projecting lens and an associated primary optical element, the projecting lens having an exit refracting surface that is continuous along the intermediate lenses.

According to one advantageous embodiment of the invention, in a plane that is horizontal, in the normal mounting order, the association of a primary optical element and an intermediate lens forms a module with an optical axis, the lighting device comprising at least three consecutive modules the optical axes of which are inclined with respect to the normal to the exit refracting surface of the projecting lens by an angle β comprised between −2° and −15°, an angle β equal to 0°, and an angle β comprised between 2° and 10°, respectively.

According to one advantageous embodiment of the invention, in a plane that is horizontal, in the normal mounting order, the association of a primary optical element (6) and an intermediate lens forms a module with an optical axis, the lighting device comprising at least three consecutive modules the optical axes of which are inclined with respect to the normal to the exit refracting surface of the projecting lens by an angle β equal to 0°, an angle β comprised between 2° and 10°, and an angle β comprised between 5° and 18°, respectively.

According to one advantageous embodiment of the invention, in a plane that is vertical in the normal mounting order, the exit lens has a principal elongation along a principal axis that is inclined by 0 to 10° with respect to the horizontal direction, the inclination between the principal axis and the horizontal direction optionally being 5°. The vertical plane is the YZ-plane defined in an orthonormal coordinate system in which the X-axis is the projection axis.

According to one advantageous embodiment of the invention, the lighting device comprises at least three primary optical elements each equipped with pixel-forming means and, in a plane that is horizontal, in the normal mounting order, the exit refracting surface of the projecting lens has a convex curvature of radius of curvature smaller than 400 mm and preferably smaller than or equal to 150 mm.

According to one advantageous embodiment of the invention, in a plane that is horizontal, in the normal mounting order, the exit refracting surface of the projecting lens has a curvature, the thickness of the projecting lens decreasing in the opposite direction to the projection direction.

According to one advantageous embodiment of the invention, in a plane that is horizontal, in the normal mounting order, the inclination α between the normal to the exit refracting surface of the projecting lens and the projection direction increases in the direction of at least one end of the projecting lens.

According to one advantageous embodiment of the invention, the projecting lens comprises an entrance refracting surface with a concave toroidal surface and an exit refracting surface with a planar or convex toroidal surface.

According to one advantageous embodiment of the invention, in a plane that is vertical in the normal mounting order, the projecting lens forms a strip of material, optionally with parallel edges.

According to one advantageous embodiment of the invention, in a plane that is horizontal, in the normal mounting order, the projecting lens is generally inclined with respect to the projection direction and its thickness decreases in the direction opposite to the projection direction.

In a plane that is vertical in the normal mounting order the projecting lens may have an entrance retracting surface with a profile the radius of curvature of which is smaller than the radius of curvature of the profile of its exit refracting surface.

Another subject of the invention is a motor-vehicle headlamp optical unit comprising a lighting device generating stripe segmented beam noteworthy in that said lighting device for lighting in strips is according to the invention.

Achieved Advantages

The invention allows field aberrations to be corrected. It allows geometric variations to be compensated for using an additional lens. The correction that the projecting lens must provide is less great. Thus, the uniformity and sharpness of the produced strips are controlled despite singularly rounded projecting-lens shapes. A lighting device generating stripe segmented beam for a vehicle headlamp according to the invention has the advantage of increasing driving safety.

DESCRIPTION OF EMBODIMENTS

Figure 1:
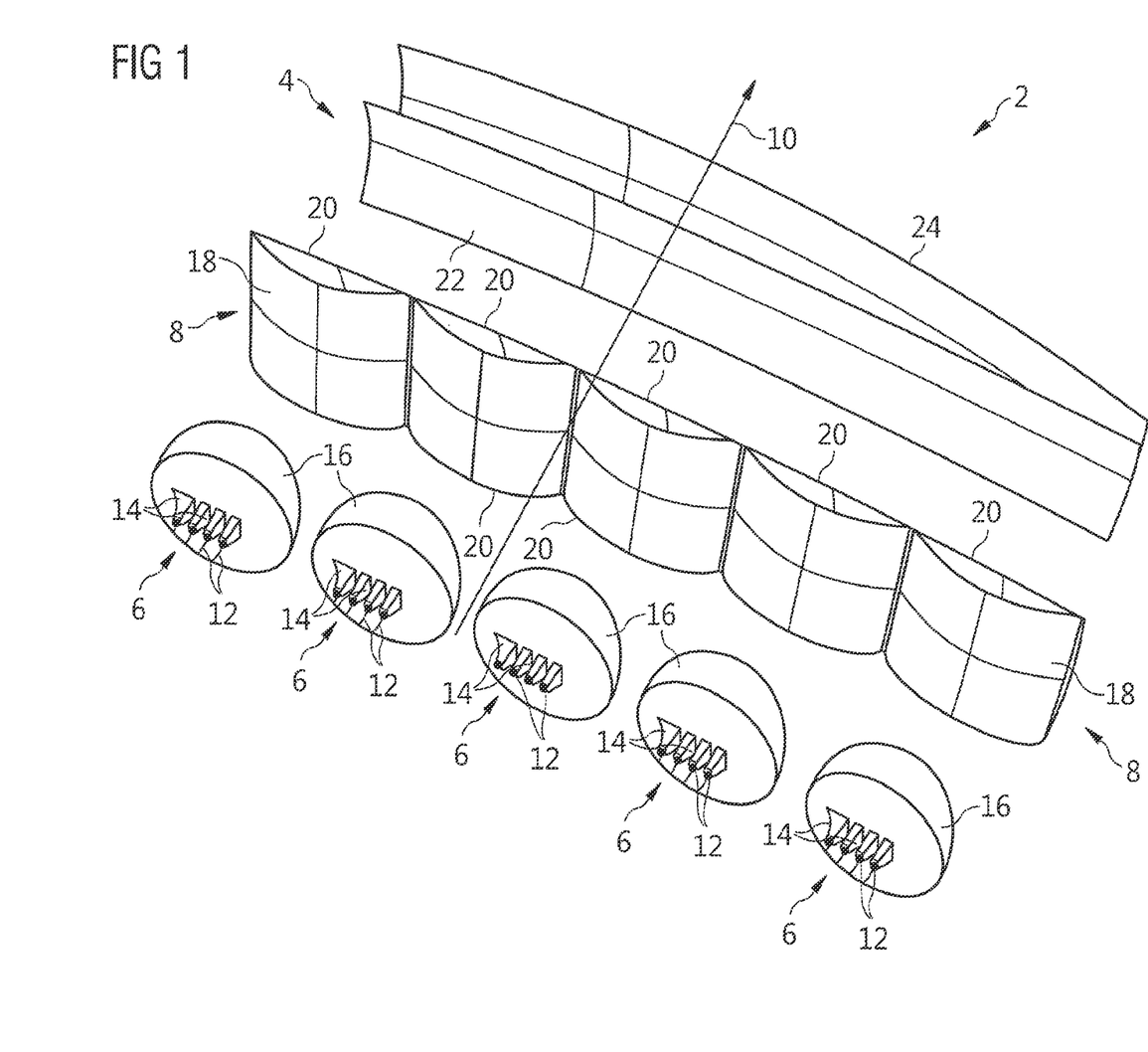
FIG. 1 shows an isometric view from behind of a lighting device generating stripe segmented beam according to the invention.

FIG. 1 shows in a simplified way a lighting device 2 according to the invention. The lighting device is generally shown in the lighting direction. The lighting device is partially represented by its refracting surfaces.

The lighting device 2 comprises, in the lighting direction, lighting modules (five in the present case) and a projecting lens 4. Each lighting module comprises a primary optical element 6 and an intermediate lens 8, the latter being placed between the projecting lens 4 and the associated primary optical element 6. The lighting device comprises an optical axis 10 along which it illuminates, and along which it generally folds and concentrates its rays.

The lighting device 2 may furthermore comprise at least one light source 12, such as a light-emitting diode or a laser, which produces light rays that penetrate into the lighting device via the primary optical element. Here, twenty light sources 12 are provided to create lighting in strips. The lighting device 2 may even comprise a casing that is not shown for the sake of clarity.

On its entrance face, each primary optical element 6 comprises pixel-forming means. Said means include at least one light guide 14 (four in the present case) and a body with a curved exit refracting surface 16. The pixel-forming means may also comprise micro-lenses or pillow lenses. Each intermediate lens 8 comprises a curved entrance refracting surface 18 and a curved exit refracting surface 20. These refracting surfaces may each have a toroidal shape, i.e. be surfaces generated by rotating a circle about an axis that is distant from the circle. The entrance refracting surfaces 18 of the intermediate lenses 8 face the primary optical elements 6. The intermediate lenses 8 together form a generally curved row. Since the intermediate lenses 8 may be spaced apart from one another, shields (not shown) may be provided at their junctions in order to avoid parasitic rays.

The projecting lens 4 comprises an entrance refracting surface 22 facing the intermediate lenses 8, and an exit refracting surface 24. Each of its refracting surfaces is continuous and may be a generally toroidal surface. The projecting lens 4 forms a continuous strip of material, the thickness of which varies from one end to the other. The maximum thickness may be observed at a lengthwise distance from the ends.

Figure 2:
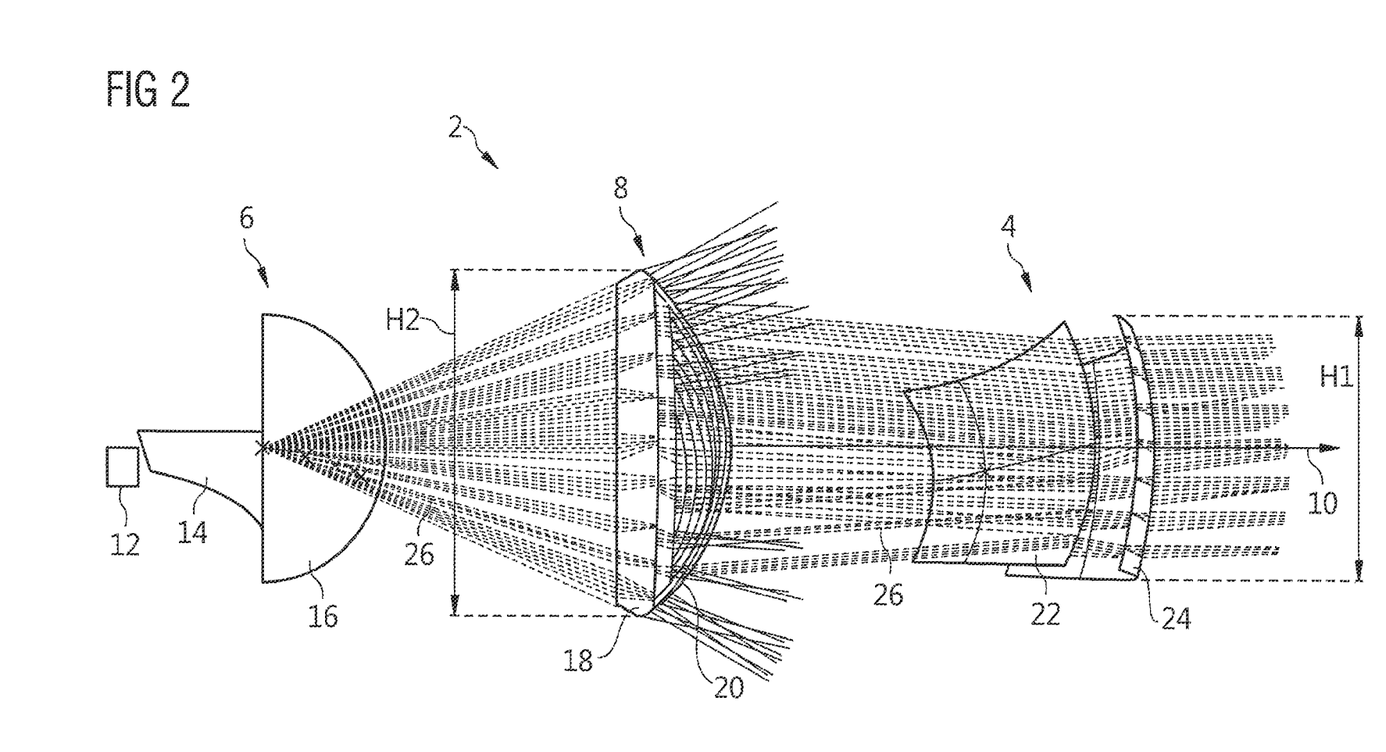
FIG. 2 illustrates a side view of a lighting device according to the invention.

FIG. 2 is a profile view of the lighting device in the normal mounting order of the lighting device in a vehicle. A light source, a primary optical element, an intermediate lens and a projecting lens are shown.

The body of the primary optical element forms a correcting section with a dome-shaped and for example hemispherical surface 16. Each light guide 14 (also referred to as a waveguide or optical guide) is associated with a primary light source 12; it transports the light through the material of the element. It has an elongation, optionally a principal elongation, along the optical axis X of the lighting device 2. The material from which the light guides 14 and the body are made is transparent. It is here a question of an optical lens material, such as an organic material or optionally glass, and is all one piece. Such an optical element is well known to those skilled in the art and may be produced such as described in document EP2743567A1.

In a vertical plane, the radiation 26 issued from the primary optical element 6 diverges. The intermediate lens 8 intercepts this divergent radiation 26 and concentrates it, by folding it, onto the projecting lens 4. It vertically distributes the radiation 26 issued from the primary optical element 6 over the height of the projecting lens 4 and preferably over its entire height.

In cross section in a vertical plane, the intermediate lens 8 has an entrance refracting surface 18 with a substantially convex profile, though alternatively it could be straight. The exit refracting surface 20 of the intermediate lens 8 here has a concave profile. The vertical profile of the intermediate lens 8 acts as a convergent lens, which redirects the rays issued from the primary optical element along the optical axis 10, thereby decreasing the inclination of the rays with respect to the optical axis. Thus, the vertical deviation that the intermediate lens 8 must ensure is decreased, this simplifying its work. The vertical profile of the intermediate lens could also be that of a divergent lens. The intermediate lens 8 acts as a barrier for the primary rays, and its height H2 is larger than the height H1 of the projecting lens 4.

In a vertical plane, the projecting lens 4 has an entrance refracting surface 22 with a concave profile and an exit refracting surface 24 with a convex profile. The entrance radius of curvature is smaller than the exit radius of curvature, so that the vertical profile of the projecting lens 4 acts such as a divergent lens.

In a vertical plane, the rays issued from the projecting lens 4 are generally parallel, and substantially inclined. They may be inclined by −2° to +8° with respect to the horizontal axis, the positive sign indicating the upward direction.

Figure 3:
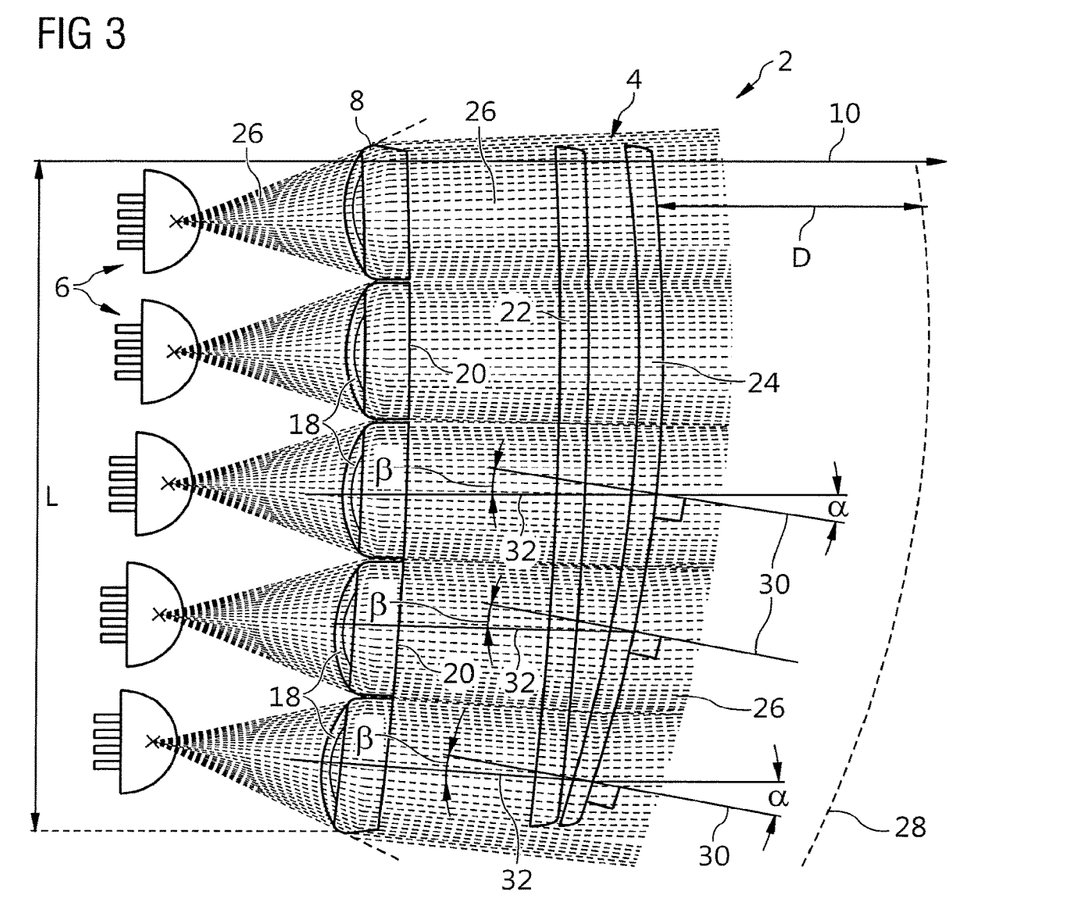
FIG. 3 depicts a view from above of a lighting device according to the invention.

FIG. 3 shows a top view of a lighting device 2 in the normal mounting order of the lighting device in a vehicle. By way of example, it may be a question of a front right lighting device 2 of a motor vehicle.

In a horizontal plane, each intermediate lens 8 has a convex entrance refracting surface 18 and a convex exit refracting surface 20, the entrance refracting surface 18 being more highly curved. The refracting surfaces vary from one intermediate lens 8 to the next in order to match the inclination and curvatures of that section of the projecting lens 4 with which each intermediate lens 8 works. The exit refracting surface 20 of each intermediate lens 8 is substantially curved, though it may be essentially straight.

In a horizontal plane, the radiation 26 issued from each primary optical element 6 diverges. Each intermediate lens 8 intercepts the divergent radiation 26 of a primary optical element 6 and deviates it by focusing it on an associated portion of the projecting lens 4. Each intermediate lens 8 horizontally distributes the radiation 26 issued from the primary optical element 6 over a dedicated zone of the projecting lens. On exiting the intermediate lenses, the rays are generally parallel.

The primary optical elements 6 are offset with respect to one another in the general projection direction. They follow the curvature of the entrance refracting surface 22 of the projecting lens 4. The entrance refracting surface 22 of the projecting lens 4 is essentially curved and optionally smooth; its surface may also have a monotonic curvature. The exit refracting surface 24 of the projecting lens 4 is curved, optionally with a monotonic curvature.

The line 28 connecting the secondary focal points of the projecting lens 4 is at a distance D that is similar to its length L. The ratio of the distance D to the length is comprised between 0.5 and 2 and preferably comprised between 0.8 and 1.2. The distance D and the length L may be equal to 20 cm.

In a horizontal plane, for example the median plane, the direction normal to the exit refracting surface 24 of the projecting lens 4 is inclined by an angle α with respect to the emitted rays. The angle α may be zero in a central zone, and maximum at one end of the projecting lens 4. The projecting lens 4 has a maximum thickness in the zone in which the angle α is zero, and a minimum thickness where the angle α is maximum.

In a horizontal plane, the optical axes 32 of the modules are generally inclined by an angle β with respect to the direction 30 normal to the exit refracting surface 24. This inclination may result from the orientation and/or the form of the intermediate lenses 8. The angle β varies from one module to the next, and may be zero for the module in the middle of a row of modules, or the module toward the internal edge of a row of modules. The neighboring modules have optical axes 32 that are inclined by an angle β of −2° and +10°, respectively, the positive direction of the angle β being the clockwise direction.

Figure 4:
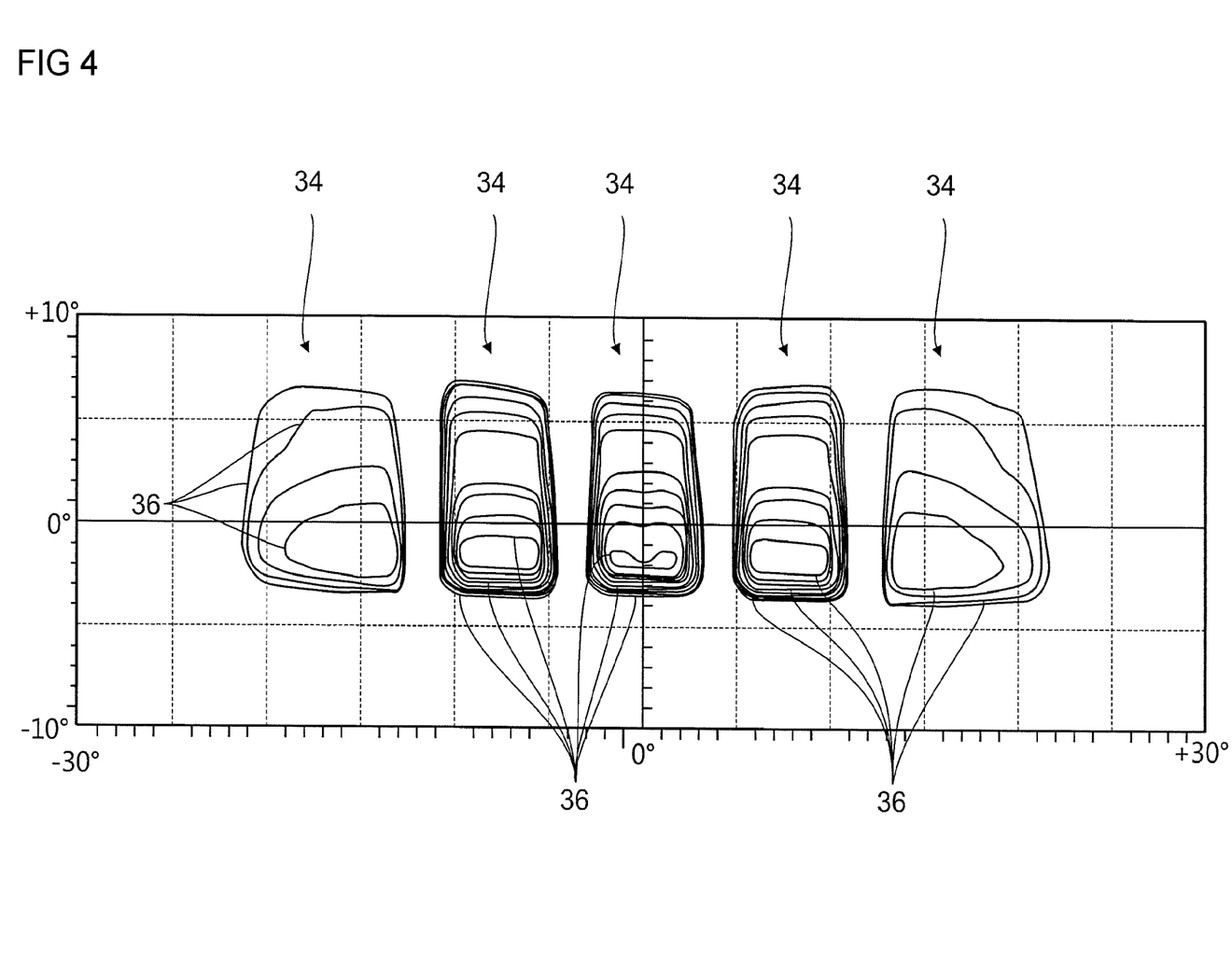
FIG. 4 is a representation of isolux curves of pixels produced the light sources of a primary optical element of a lighting device generating stripe segmented beam according to the invention.

FIG. 4 shows a simulation of the light radiation of a primary optical element projected onto a wall. An orthonormal coordinate system allows the illuminated field to be illustrated by virtue of the scales.

The radiation forms a plurality of pixels 34 (five in the present case) which each correspond to one of the light sources of a primary optical element (including five thereof); in other words, each pixel 34 corresponds to one given light source. Each pixel 34 may have a generally rectangular strip shape. The strips may have parallel horizontal and/or vertical edges. Such lighting may have a central zone with, for example, at least three similar strips; and optionally a lateral zone with strips of lesser intensity.

Each strip is formed by a substantially divergent light beam the width of which, along the horizontal axis, may be comprised between 1° and 2°. All of the strips have horizontal cut-offs, this favoring the concentration of light at a given height. The produced strips are regularly offset angularly from one another, this possibly facilitating overlap with the strips of another primary optical element of the lighting device.

At least two or most of the pixels 34 may have similar isolux curves 36. The order of the isolux curves 36 of the various pixels 34 may be symmetric in a vertical plane. Each isolux curve 36 may indicate an increase in light intensity comprised between 25% and 100% and optionally between 30% and 50% with respect to the preceding isolux curve 36. The isolux curves 36 of the pixels 34 generally have rectangular shapes and certain isolux curves 36 may superpose level with the vertical edges of the pixels 34. Likewise, certain isolux strips of a pixel may have isolux curves that overlap level with a lower edge. These characteristics express the clear and sharp aspect of the luminous strips. Most of the pixels may have an equal or similar maximum light intensity. By similar, what may be meant is a difference smaller than 25% and preferably smaller than 5%.

The particularities of the invention facilitate superposition of the strips of light in order to generate lighting that is controlled both on the level of each primary optical element and on the level of the lighting device as a whole. Such radiation is particularly suitable for illuminating the dynamic environment surrounding a moving motor vehicle.

The invention claimed is:

1. A lighting device generating stripe segmented beam for a motor-vehicle headlamp, said lighting device comprising:
    a primary optical element equipped with a plurality of light guides spaced apart from one another and having an exit refracting surface, each of the light guides including an elongation oriented along an optical axis of the lighting device and configured to interact with one of at least one primary light source;
    a projecting lens; and
    an intermediate lens that is placed between the exit refracting surface of the primary optical element and the projecting lens, and is configured so as to concentrate the radiation issued from the exit refracting surface of the primary optical element onto the projecting lens,
    wherein the lighting device is configured so as to project light entering into the light guides and exiting via the projecting lens in the form of a luminous strip.

2. The lighting device according to claim 1, wherein the exit refracting surface of the primary optical element is generally spherical, and the light guides have a rectangular profile transversely to the lighting direction of the lighting device.

3. The lighting device according to claim 2, wherein in the normal mounting order the intermediate lens comprises an exit refracting surface with a profile that is convex in a vertical plane, and optionally in a horizontal plane.

4. The lighting device according to claim 2, wherein in the normal mounting order the intermediate lens comprises a real focal point and is at the same height or is of greater height than the projecting lens, or the intermediate lens comprises a virtual focal point and is of lesser height than the projecting lens.

5. The lighting device according to claim 1, wherein in the normal mounting order the intermediate lens comprises an entrance refracting surface with a profile that is convex in a horizontal plane, and optionally a profile that is concave in a vertical plane.

6. The lighting device according to claim 1, wherein in the normal mounting order the intermediate lens comprises an exit refracting surface with a profile that is convex in a vertical plane, and optionally in a horizontal plane.

7. The lighting device according to claim 1, wherein in the normal mounting order the intermediate lens comprises a real focal point and is at the same height or is of greater height than the projecting lens, or the intermediate lens comprises a virtual focal point and is of lesser height than the projecting lens.

8. The lighting device according to claim 1, wherein the lighting device is configured so as to project a plurality of parallel luminous strips, each corresponding to one of the at least one primary light source.

9. The lighting device according to claim 8, wherein the at least one primary light source are a light-emitting diode and/or a laser, each source being associated with one of the light guides.

10. The lighting device according to claim 1, wherein, in a plane that is vertical, in the normal mounting order, the projecting lens comprises an entrance refracting surface with a profile that is concave or planar and an exit refracting surface with a convex profile.

11. The lighting device according to claim 1, wherein, in a plane that is vertical, in the normal mounting order, the projecting lens has a divergent- lens profile.

12. The lighting device according to claim 1, wherein it comprises a plurality of primary optical elements and a plurality of intermediate lenses, each intermediate lens being associated with a primary optical element and placed between the projecting lens and an associated primary optical element, the projecting lens having an exit refracting surface that is continuous along the intermediate lenses.

13. The lighting device according to claim 12, wherein, in a plane that is horizontal, in the normal mounting order, the association of a primary optical element and an intermediate lens forms a module with an optical axis, the lighting device comprising at least three consecutive modules the optical axes of which are inclined with respect to the normal to the exit refracting surface of the projecting lens by an angle β comprised between −2° and −10°, an angle β equal to 0°, and an angle β comprised between 2° and 10°, respectively.

14. The lighting device according to claim 12, wherein, in a plane that is horizontal, in the normal mounting order, the association of a primary optical element and an intermediate lens forms a module with an optical axis, the lighting device comprising at least three consecutive modules the optical axes of which are inclined with respect to the normal to the exit refracting surface of the projecting lens by an angle β equal to 0°, an angle β comprised between 2° and 10°, and an angle β comprised between 5° and 18°, respectively.

15. The lighting device according to claim 12, wherein it comprises at least three primary optical elements each equipped with a plurality of light guides and, in a plane that is horizontal, in the normal mounting order, the exit refracting surface of the projecting lens has a convex curvature of radius of curvature smaller than 400 mm and preferably smaller than or equal to 150 mm.

16. The lighting device according to claim 1, wherein, in a plane that is horizontal, in the normal mounting order, the exit refracting surface of the projecting lens has a curvature, the thickness of the projecting lens decreasing in the opposite direction to the projection direction.

17. The lighting device according to claim 1, wherein, in a plane that is horizontal, in the normal mounting order, the inclination a between the normal to the exit refracting surface of the projecting lens and the projection direction increases in the direction of at least one end of the projecting lens.

18. The lighting unit for a motor-vehicle headlamp, said unit comprising a lighting device generating stripe segmented beam, wherein said lighting device is according to claim 1.

19. The lighting device according to claim 1, wherein in the normal mounting order the intermediate lens comprises an entrance refracting surface with a profile that is convex in a horizontal plane, and optionally a profile that is concave in a vertical plane.

20. The lighting device according to claim 1, wherein the lighting device is configured so as to project a plurality of parallel luminous strips, each corresponding to one of the at least one primary light source.

21. A lighting device generating a stripe segmented beam for a motor-vehicle headlamp, said lighting device comprising:
- a primary optical element equipped with a plurality of light guides spaced apart from one another and having an exit refracting surface, the plurality of light guides configured to interact with a primary light source;
- a projecting lens comprising a continuous strip of material whose thickness in the optical axis direction varies along a direction normal to the optical axis direction from one end to the other end; and
- an intermediate lens that is placed between the exit refracting surface of the primary optical element and the projecting lens, and is configured so as to concentrate the radiation issued from the exit refracting surface of the primary optical element onto the projecting lens,
- wherein the lighting device is configured so as to project light entering into the light guides and exiting via the projecting lens in the form of a luminous strip.

* * * * *